No. 764,277. PATENTED JULY 5, 1904.
F. G. DIETERICH.
AUTOMATIC SPOUT CUT-OFF MECHANISM.
APPLICATION FILED MAR. 22, 1904.
NO MODEL. 3 SHEETS—SHEET 1.
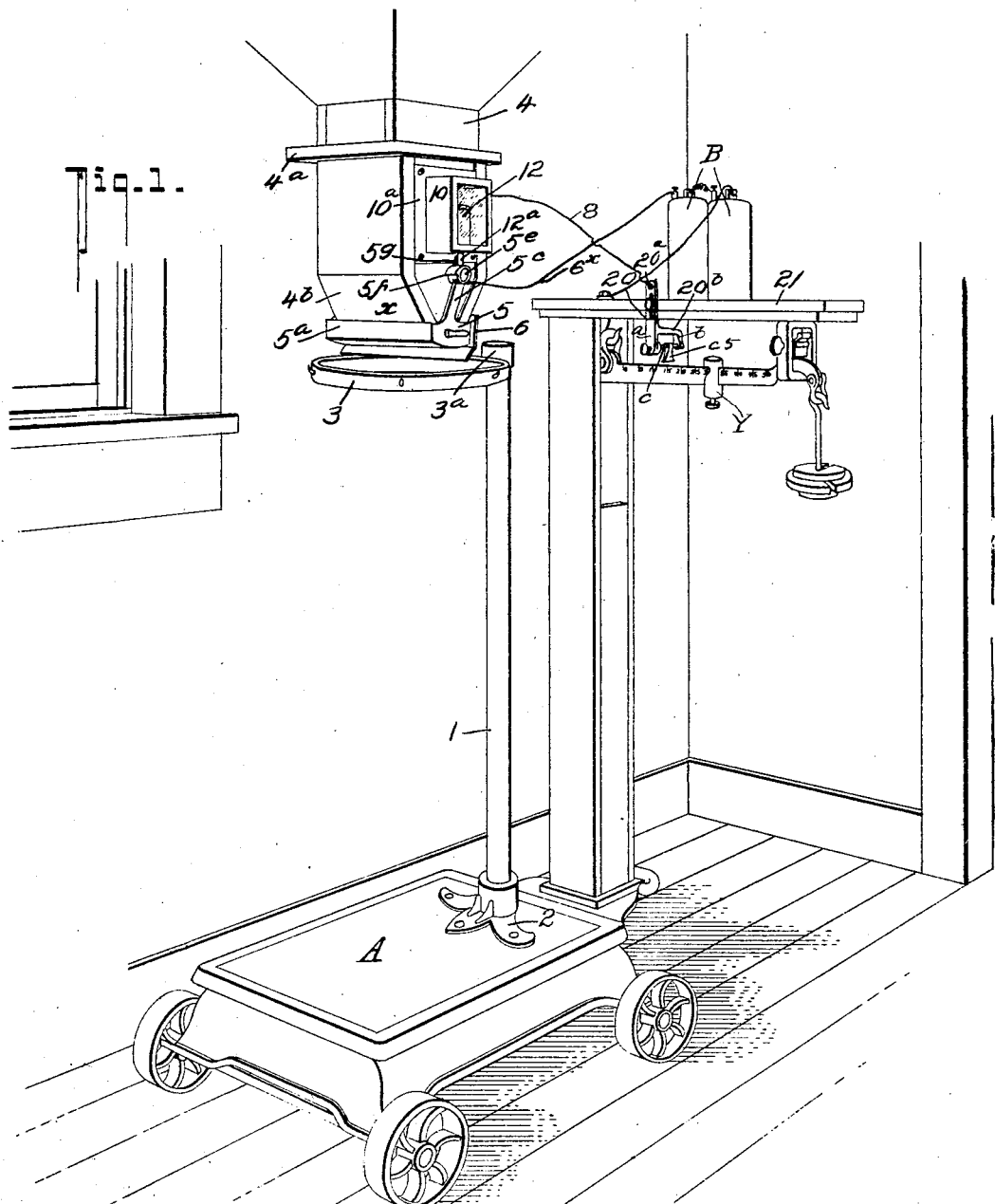
WITNESSES:
F. C. Gibson.
John T. Schrott
INVENTOR
Fred G. Dieterich.
BY
Fred G. Dieterich & Co.
ATTORNEYS

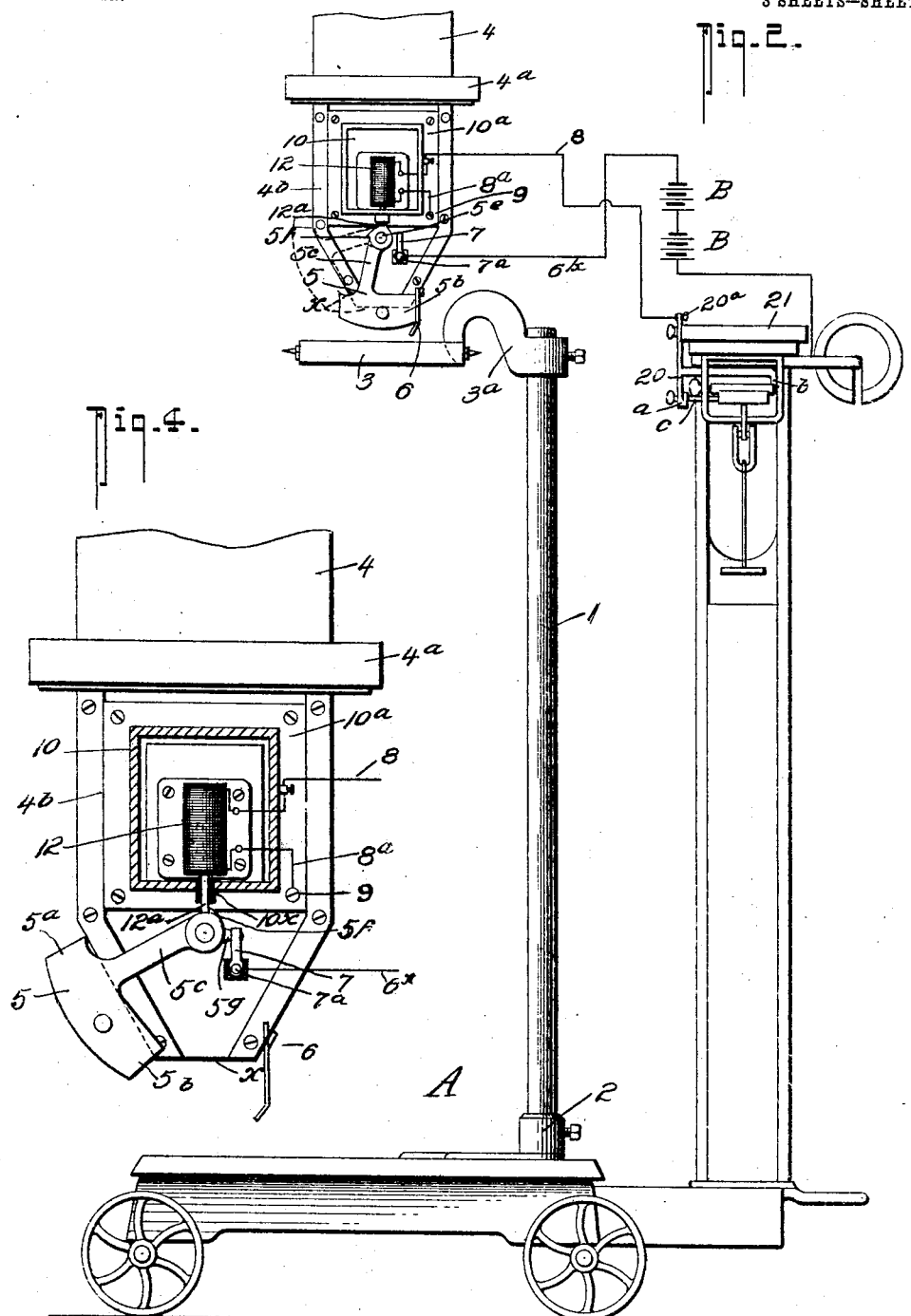

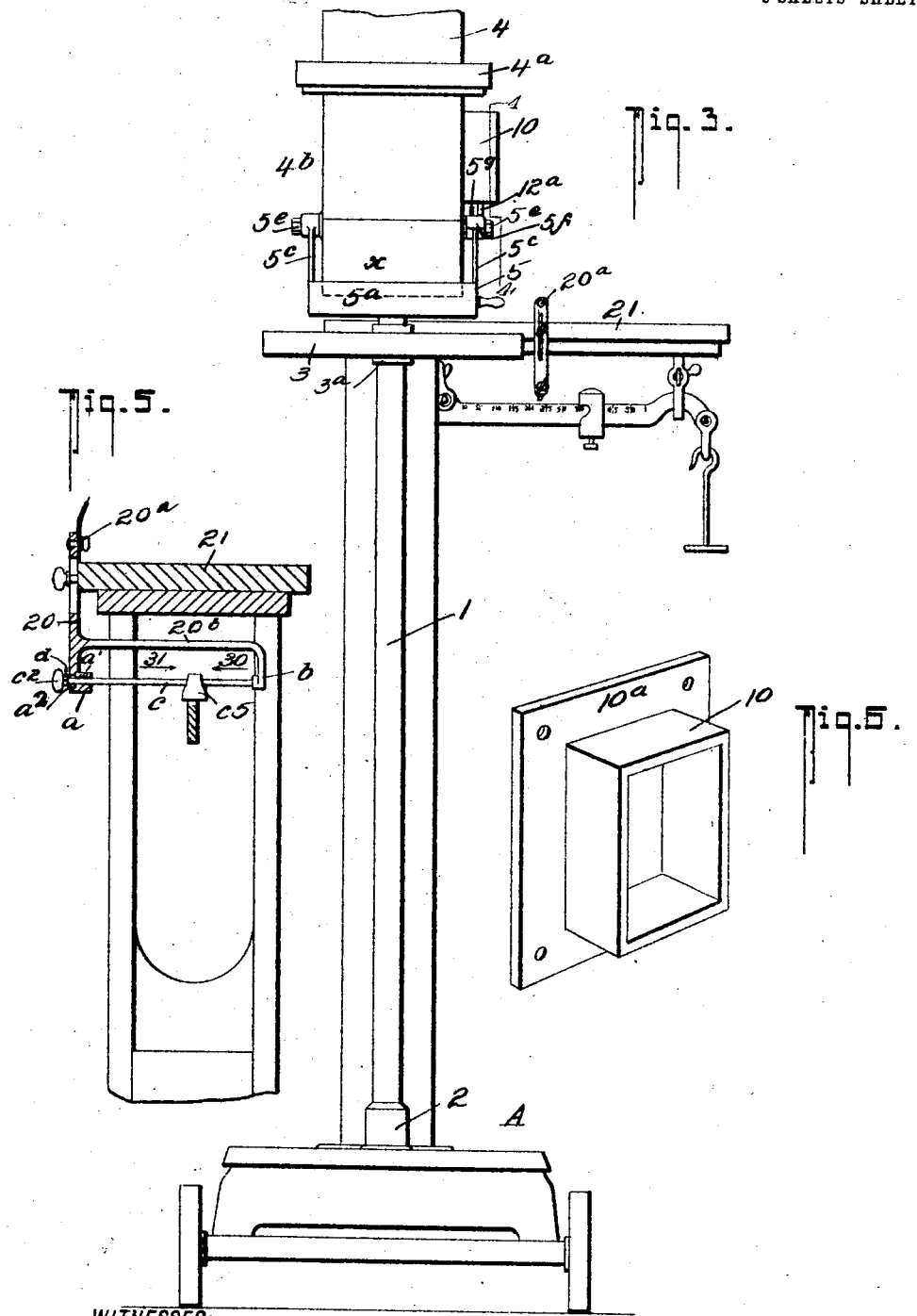

No. 764,277.                                                                 Patented July 5, 1904.

UNITED STATES PATENT OFFICE.

FRED G. DIETERICH, OF WASHINGTON, DISTRICT OF COLUMBIA, ASSIGNOR TO HARRY K. IVENS AND JOSEPH K. BOLAND, OF NEW ORLEANS, LOUISIANA.

AUTOMATIC SPOUT CUT-OFF MECHANISM.

SPECIFICATION forming part of Letters Patent No. 764,277, dated July 5, 1904.

Application filed March 22, 1904.  Serial No. 199,420.  (No model.)

*To all whom it may concern:*

Be it known that I, FRED G. DIETERICH, residing at Washington, District of Columbia, have invented certain new and useful Improvements in Automatic Spout Cut-Off Mechanisms, of which the following is a specification.

This invention relates generally to weighing-machines of that type utilized for weighing predetermined quantities of granular or other similar material, and it more particularly seeks to provide an improved means for automatically regulating the spout cut-off devices; and the said invention primarily seeks to provide a simple, inexpensive, and easily-adjusted mechanism adapted to be readily attached beneath the mouth of a thresher, rice-mill, flour-mill, or elevator and connected with the ordinary platform or counter scale.

Another object of my invention is to provide an improved coöperative arrangement of the several parts constituting my invention combined in such a manner that their action will be quick, positive, and accurate, and especially designed to be under control of an electromagnet in an electric circuit shunted into an open or closed condition by the shifting of the scale-beam, in which a special combination of elements is also provided whereby when the cut-off or valve member is moved to an open position by hand a circuit-maker in the magnet-circuit is rendered active, and when the magnet is energized the valve is released to gravitate to its closed position and the magnet-circuit at the same time broken, whereby to avoid unnecessary use of the batteries.

My invention consists in certain details of construction and peculiar combination of parts hereinafter described and claimed, and illustrated in the accompanying drawings, in which—

Figure 1 is a perspective view which illustrates an ordinary platform-scale and a delivery spout or bin with my improved automatic actuating spout cut-off devices applied. Fig. 2 is a front elevation of the spout cut-off-controlling devices, the scale, and the bag-holder combined therewith. Fig. 3 is an end elevation of the parts shown in Fig. 2. Fig. 4 is a transverse section on the line 4 4 of Fig. 3, the cut-off or valve device being to its elevated or open position. Fig. 5 is a cross-section of the scale-beam and the adjustable circuit-maker device that coöperates with the said beam. Fig. 6 is a perspective view of the magnet-carrying casing detached from the discharge or hopper end of the bin.

In the practical application of my invention the platform or counter scale A, which may be of any well-known and approved construction, is located adjacent to but preferably underneath the discharge-mouth of the thresher, rice-mill, or other chute from which granular or like material flows freely, and the said scale is also provided with a bag-holding means, which may also be of any approved arrangement—for example, as shown in the drawings, in which—

1 designates a standard secured to the socket-piece 2, made fast to the scale-platform.

3 designates a bag-holding ring secured to the bracket $3^a$, vertically adjustable on the standard 1.

4 designates a spout or other discharge portion of the bin or other receptacle that receives the material to be drawn off into sacks in predetermined quantities, and $4^a$ designates a flange-piece upon the lower end of the bin or chute, to which the contracted throat or discharge hopper $4^b$ is attached and to which the cut-off and the electrical controlling or latch devices therefor are connected in the manner presently described. As clearly shown in Fig. 2, the lower end of the discharge or hopper portion $4^b$ of the bin tapers to form a contracted discharge-throat, which in the operative adjustment of the complete mechanism is disposed directly over the bag-holding ring. The discharge-throat $x$ is normally cut off by gravity-closed cut-off valve 5, ⌊_⌋-shaped in longitudinal section, with one of its sides, $5^a$, closed and the other side, $5^b$, open, and the said cut-off 5 is of a length sufficient to extend over the full width of and lap the opposite sides of the discharge or hopper portion $4^a$ $4^b$, as clearly shown in Fig. 3, and when the cut-off 5 is at its closed position the open side $5^b$ is shut by reason of abutting against the stop-plate 6, pendently supported from the part $4^b$ as shown. By forming the cut-off as described the throat $x$ is positively closed when the said cut-off is down, and waste of material by overflow at the sides and ends of the valve or cut-off is reduced to the minimum.

The cut-off or valve 5 is pivotally supported to swing vertically in the arc of the circle, and it has a pair of side arms $5^c$ $5^c$, that extend up over the ends of the part $4^b$, (see Fig. 3,) and the ends of the said arm terminate in circular hubs $5^d$, which engage with the stud or pintle members $5^e$ $5^e$, that project from the ends of the part $4^b$, and which are disposed in the vertical plane of the throat $x$, whereby to cause the cut-off 5 to normally gravitate into a position to close off the said throat, as clearly shown in Fig. 2. One of the arms $5^c$ has a handle for conveniently swinging the cut-off up to the position shown in dotted lines in Fig. 2 to engage with the detent or latch device presently referred to.

10 designates a casing, preferably formed with a glass front, which has a flange $10^a$ for securing it to the front of the discharge-hopper $4^b$, and the said casing, as will be clearly seen in Fig. 3, projects out from the said hopper-body $4^b$ over the hinge end of the arm $5^c$ of the swinging cut-off or valve at that side.

Within the casing 10 is supported in a vertical position a solenoid-magnet 12, the plunger or armature $12^a$ of which extends down through an aperture $10^x$ in the bottom of the casing 10 to engage with the hub $5^c$ of the cut-off when the said cut-off is manually lifted to its open position and to provide for automatically locking the said cut-off to its elevated position. The said hub $5^c$ is provided with a heel-piece $5^f$, arranged to ride under and lift the pole or plunger $12^a$ of the magnet as the cut-off is swung up until the heel passes under the plunger $12^a$, when the latter drops by gravity in front of the said heel-piece, and thereby locks the cut-off to its elevated position, it being understood that during this operation the magnet is not energized. The hub $5^c$ is also provided with a projection $5^g$, adapted when the cut-off is raised to engage with the contact-plate 7, mounted upon an insulated base secured to the side of the discharge-hopper $4^b$, and the said plate receives a binding-post $7^a$, to which one terminal of the circuit-wire $6^x$ connects.

Secured to the side of the casing 10 and grounded therewith is a binding-post 9, to which one terminal of the circuit-wire 8 connects, the other terminal of which joins with the circuit-closing devices controlled by the scale-beam, as hereinafter explained. The wire $6^x$ joins with one pole of a set of batteries B, the other pole of which is connected with and is grounded through the scale-frame.

So far as described the manner in which my construction of automatic cut-off and weighing mechanism operates is best explained as follows: The cut-off 5 being at its normal or closed position is out of contact with the contact member 7 in the electrical circuit to the magnet, the windings of which join, through the post 9 and the casing, with the post 7, is then broken, and the said magnet is deënergized. The pole-piece or armature of the said magnet then drops by gravity to its lowermost limit in position to be engaged by the heel of the cut-off frame. The bag or receptacle having been positioned under the discharge-throat of the hopper, the operator raises the cut-off to the position shown in dotted lines in Fig. 2 until its heel-piece passes under and interlocks with the plunger $12^a$ of the solenoid-magnet 12, and at the same time that it engages with the said plunger $12^a$ the extension on the aforesaid cut-off arm contacts with the plate 7, and thereby closes the break in the magnet-controlling circuit at that point, the circuit for the magnet being at its time still broken by reason of the circuit-closing devices that are controlled by the scale-beam being still open. When the bag or other receptacle on the platform-scale is filled to the desired weight, the scale-beam shifts and in this movement acts upon the circuit-closer that coöperates therewith, which then closes the circuit through the batteries and energizes the solenoid-magnet, which thereby pulls up the plunger armature or detent $12^a$ and releases the cut-off 5, which then gravitates to its closed position and automatically shuts off the flow of material and simultaneously breaks the circuit at the post 7.

The circuit-breaking devices controlled by the scale-beam I prefer to arrange in the manner best shown in Figs. 1 and 5, from which it will be seen that I provide an arm 20, secured to one edge of the scale-arm 21, on which is mounted the binding-post $20^a$, that receives the end of the wire 8, that leads to the magnet. The lower end of the member 20 has an integral yoke-shaped horizontal extension $20^b$, that projects inwardly over the scale-beam, and the ends of the yoke portions terminate in bosses $a\,b$, apertured to receive a rod $c$, endwise movable within the said bosses $a\,b$. The aperture $a'$ in the boss $a$ has an enlarged non-circular portion $a^2$, adapted under the inward shifting of the rod $c$ to receive the square hub $d$ of the crank member $c^2$, fixedly secured to the rod $c$ for turning the same to adjust the contact-piece $c^5$ and into and out of an operative position. When the rod $c$ is shifted, (indicated by the arrow 30,) the contact-piece $c^5$ gravitates to a vertical position to be engaged by the scale-beam when it rises by reason of the pull-down weight regulated by the adjustment of the beam-adjuster Y; but when the said rod is shifted in the opposite direction (indicated by the arrow 31) the contact-piece $c^5$, by first properly turning the rod $c$, will be held out of operation or circuit-closing position by reason of the square hub of the crank member then engaging the non-circular part of the aperture $a^2$ in the boss $a$. When the valve or gate 5 is open, as shown in Fig. 4, and the contacts $5^g$ and 7 are closed, as soon as the scale-beam makes contact with the member $c^5$ the circuit will be closed, the current flowing from the battery will pass through the scale-beam, across contacts $c^5$ to post $20^a$, and thence by means of wire 8 through magnet 12, from whence it flows through wire $8^a$ to the framework of the spout 2 to contact $5^g$, from whence it passes to contact 7 and through wire $6^\times$ to battery, completing the circuit and causing the magnet 12 to become energized to suck up its detent $12^a$ to release the gate or cut-off 5, which gravitates to its closed position, as shown in Fig. 2, and simultaneously opens the circuit at contacts $5^g$ and 7.

From the foregoing description, taken in connection with the accompanying drawings, it is believed the complete construction and operation and advantages of my invention will be readily understood by those skilled in the art to which it appertains. The parts are so arranged that the flow of material is instantly cut off automatically, thereby giving absolutely correct weight. The construction is of such character that skilled labor is not required to look after the same, and the action thereof is such that it is possible to have a single operator look after a number of bag-fillers, thereby reducing the cost of operation of my improved cut-off devices to the minimum.

I am aware that bag and packages filling apparatus have heretofore been provided in which the cut-off or valve is held to its open position by latch devices arranged to be released by electromechanical means and in which the current that energizes the magnet is controlled by the shifting of the scale-beam, and I thereby make no claim, broadly, for such operation of devices. My invention differentiates, so far as I know, from what has been provided in the detailed arrangement and peculiar coöperation of the gravity-closing cut-off, the solenoid-switch, with its pole-piece or detent, adapted to act directly on the cut-off, and the special construction of cut-off whereby when it is manually turned to interlock directly with the magnet-actuated detent it also closes one of the cut-outs in the magnet-controlling circuit. When the gate automatically drops to close the offtake to stop the discharge of the material, it simultaneously opens or breaks the said circuit, the essential feature of my invention also comprehending the exact details of construction hereinbefore described and illustrated, and specifically pointed out in the appended claims.

Having thus described my invention, what I claim, and desire to secure by Letters Patent, is—

1. In an automatic spout cut-off mechanism of the character described, the combination with a scale, and a spout arranged to discharge into a receptacle supported on the scale; of a pivotally-mounted cut-off for the discharge end of the spout which comprises a closure member that normally gravitates to a position to cut off the spout, a detent that drops by gravity to engage the closure member to hold it when swung to its open position, electromechanical devices adapted when energized to disengage the gravity-dropped detent from the closure member, said electromechanical devices including a circuit-closer that coöperates with the scale-beam substantially in the manner shown and for the purposes described.

2. An automatic spout cut-off which comprises in combination with a beam-scale adapted to support the receptacle to be filled, a spout arranged to discharge into the receptacle, a cut-off valve pivotally mounted on the spout and adapted to swing down by gravity to close the discharge-mouth of the spout, said valve having a catch portion, a solenoid-magnet whose pole-piece is arranged to engage the catch portion of the valve when the magnet is deënergized, an electric circuit for the magnet, a circuit-closer on the scale controlled by the movement of the scale-beam, and a second circuit-closer, in the magnet-circuit of which the valve is one of the terminals, the other terminal of which is mounted on the spout-frame and is adapted to be engaged by the valve when it is normally swung up to uncover the spout-discharge, all being arranged substantially for the purposes shown and described.

3. An automatic cut-off mechanism for weighing-machines, which comprises the combination with a beam-scale adapted to support the receptacle being filled, and a filling-spout arranged to discharge into the said receptacle; of a cut-off valve which is pendently supported on the lower end of the spout and including arms at the ends that project up over the opposite ends of the spout, the said arms having head portions that are pivotally connected to the spout, each of said head portions having a catch and a projection, the latter of which forms a circuit-closer terminal and is adapted to engage with an opposing terminal when the valve is swung to its open position, a solenoid-switch coöperatively connected with one of the said arms of the valve the armature or pole-piece of which automatically interlocks with the catch portion on the valve-arm when the said valve is manually swung up to its open position, an electric circuit in line with the aforesaid circuit-closer, a second circuit-closer in said circuit controlled by the movement of the scale-beam, all being arranged substantially as shown and described.

4. An automatic cut-off for weighing-machines, which comprises a beam-scale provided with a support for holding the bag to be filled, a filling-spout arranged to discharge into the said bag, a cut-off valve mounted on the lower end of the spout and consisting of a bottom plate adapted to swing under the discharge-mouth of the spout and an arm at each end that projects up over the opposite ends of the spout, said arms terminating in head portions that are pivotally hung on the spout ends in such manner that the bottom plate of the valve normally swings under and closes the spout-discharge, said head portions having a cam-shaped catch and a lateral extension, the said extension forming one terminal of a circuit-closure, the other terminal of which is mounted on the adjacent spout end, a solenoid-magnet mounted on the spout-frame and insulated therefrom, the armature or plunger of which is arranged to coöperate with the cam-shaped catch on the valve-arm head, to automatically interlock with the said catch when the valve is swung up to uncover the spout-discharge when the magnet is deënergized, an electric circuit for the said magnet in line with the aforesaid circuit-closer, and a second circuit-closer in said circuit closed by the rise of the scale-beam, all being arranged substantially as shown and for purposes specified.

5. In an automatic cut-off for weighing-machines, the combination with a beam-scale, a package-filler adapted to discharge into the receptacle which is held on the scale, a cut-off valve that moves by gravity to close off the discharge-mouth of the filler, an electromagnet-controlled detent for holding the valve up to its open position, an electric circuit for the magnet, a circuit-closer in the said electric circuit that coacts with the scale-beam and which comprises a supporting-frame vertically adjustable with respect to the scale-beam, a contact member mounted upon the said vertically-adjustable support and transversely adjustable with respect to the scale-beam, a rocking shaft mounted upon the said support that receives the aforesaid cut-off member and a means for rocking the said shaft and for holding it locked to its rocked position as set forth and for the purposes described.

FRED G. DIETERICH.

Witnesses:
J. MIDDLETON,
ALBERT E. DIETERICH.